United States Patent [19]

Borrman et al.

[11] 4,356,147
[45] Oct. 26, 1982

[54] FLUID TIGHT AND THERMALLY INSULATED COUPLING ASSEMBLY

[75] Inventors: Bo Borrman; Knud Engedal, both of Vasteras, Sweden

[73] Assignee: AB Asea-Atom, Vasteras, Sweden

[21] Appl. No.: 17,767

[22] Filed: Mar. 5, 1979

[30] Foreign Application Priority Data

Mar. 8, 1978 [SE] Sweden .............................. 7802627

[51] Int. Cl.³ .......................................... G21C 19/32
[52] U.S. Cl. ........................................................ 376/291
[58] Field of Search ...................... 176/87, 50, 37, 38; 285/41, 47, 158; 138/37; 277/116.8, 142, 144, 170, 190; 376/241, 292

[56] References Cited

U.S. PATENT DOCUMENTS

| | | | |
|---|---|---|---|
| 1,927,310 | 9/1933 | Edwards | 277/117 |
| 2,332,529 | 10/1943 | Reppert | 285/47 |
| 3,085,961 | 4/1963 | Charlesworth | 176/87 |
| 3,093,398 | 7/1963 | Fawcetts | 176/64 |
| 3,249,505 | 5/1966 | Laurent | 176/87 |
| 3,330,735 | 7/1967 | Hassig | 176/87 |
| 3,488,067 | 1/1970 | Sommer | 176/87 |
| 3,536,584 | 10/1970 | Long | 176/87 |
| 3,807,772 | 4/1974 | Delisle | 285/41 |
| 3,816,244 | 6/1974 | Stracke | 176/87 |
| 3,977,439 | 8/1976 | Lambert | 176/50 |
| 4,079,967 | 3/1978 | Schoessow | 176/87 |
| 4,081,322 | 3/1978 | Aubert et al. | 176/37 |
| 4,174,123 | 11/1979 | Schluderberg | 176/87 |
| 4,212,594 | 7/1980 | Sheer . | |

*Primary Examiner*—Sal Cangialosi
*Attorney, Agent, or Firm*—Pollock, Vande Sande & Priddy

[57] ABSTRACT

A coupling assembly for joining an inlet nozzle with a conduit assembly extending concentrically therein, to provide a fluid-tight and thermally insulated flow passageway for introducing cold water into a nuclear reactor pressure vessel and the like.

The coupling assembly comprises a protective sleeve surrounding the conduit assembly and wedged into abutting contact with an end portion of the conduit assembly and an inner surface of the inlet nozzle to form a fluid-tight seal therebetween. A fluid insulating medium having a decreasing temperature gradient is positioned between a portion of the protective sleeve and the surrounding inlet nozzle to create a similar decreasing temperature gradient within the inlet nozzle, in order to protect the nozzle against thermal shocks resulting from the difference in temperature between the relatively warm reactor pressure vessel surrounding the inlet nozzle and the relatively cold water flowing through the inlet nozzle.

16 Claims, 2 Drawing Figures

FLUID TIGHT AND THERMALLY INSULATED COUPLING ASSEMBLY

BACKGROUND OF THE INVENTION

The present invention is generally related to a fluid-tight and insulated coupling assembly for joining concentrically arranged fluid passageways. In particular, the present invention is directed to a unique coupling assembly adaptable for creating a fluid-tight and thermally insulated connection between a pressure vessel inlet nozzle and a fluid conduit assembly extending concentrically therein.

Nuclear reactors usually require that a stream of cold water be introduced into the reactor pressure vessel for cooling the reactor tubes mounted therein. In order to introduce cold water into the pressure vessel, a nozzle assembly is fixedly mounted within an inlet of the pressure vessel wall and a flow conduit is concentrically positioned within the inlet nozzle. In order to prevent leakage of cold water flowing into the pressure vessel, a resilient sealing member may be arranged between a concentrically positioned conduit and nozzle assembly. Flow passageways constructed in this manner have proven less than completely satisfactory, in that conventional sealing members are usually formed of a rubberlike material which tends to deteriorate when subject to large temperature gradients as may exist within the inlet nozzle. Furthermore, because the conduit assembly may be inclined relative to the inlet nozzle as a result of the installation procedure, the resilient sealing member may not sit properly therebetween, leading to the leakage of cold water past the sealing member and into direct contact with a portion of the inlet nozzle which contacts the pressure vessel. This, in turn, can lead to thermal shocks occurring in the inlet nozzle as a result of the relatively large temperature gradient extending through the inlet nozzle from the warm pressure vessel to the cold water. It is therefore essential that a fluid-tight and thermally insulated coupling be arranged between the inner conduit and surrounding inlet nozzle, in order to provide a cold water flow passageway into the pressure vessel without subjecting the inlet nozzle to thermal shocks.

As will be discussed in detail hereinafter, the present invention solves the problems confronting the prior art assemblies, while at the same time providing a fluid-tight and thermally insulated fluid passageway extending through a nuclear reactor pressure vessel inlet and the like.

OBJECTS OF THE PRESENT INVENTION

An object of the present invention is to provide a fluid-tight flow passageway through a pressure vessel inlet and the like, wherein a nozzle is fixedly supported in the pressure vessel inlet and is thermally insulated from a conduit assembly extending therein.

A further object of the present invention is to provide a fluid-tight coupling between a conduit assembly and a surrounding inlet nozzle, wherein the conduit assembly includes a pair of concentrically arranged conduit portions having a layer of thermal insulation therebetween.

Another object of the present invention is to provide a flow passageway connection assembly wherein a protective sleeve is positioned between an inner conduit and a surrounding inlet nozzle, with the protective sleeve and inlet nozzle defining a space therebetween, which may be filled with a liquid medium to thermally insulate the inlet nozzle from the cold water flowing through the inner conduit.

These and other objects of the present invention will become apparent from a reading of the following specification and claims, together with the accompanying drawings, wherein similar elements are referred to and are indicated by similar reference numerals.

BRIEF DESCRIPTION OF THE DRAWINGS

The present invention can be best understood with reference to the accompanying drawings, wherein.

DETAILED DESCRIPTION OF THE PREFERRED EMBODIMENT

Figure 1:
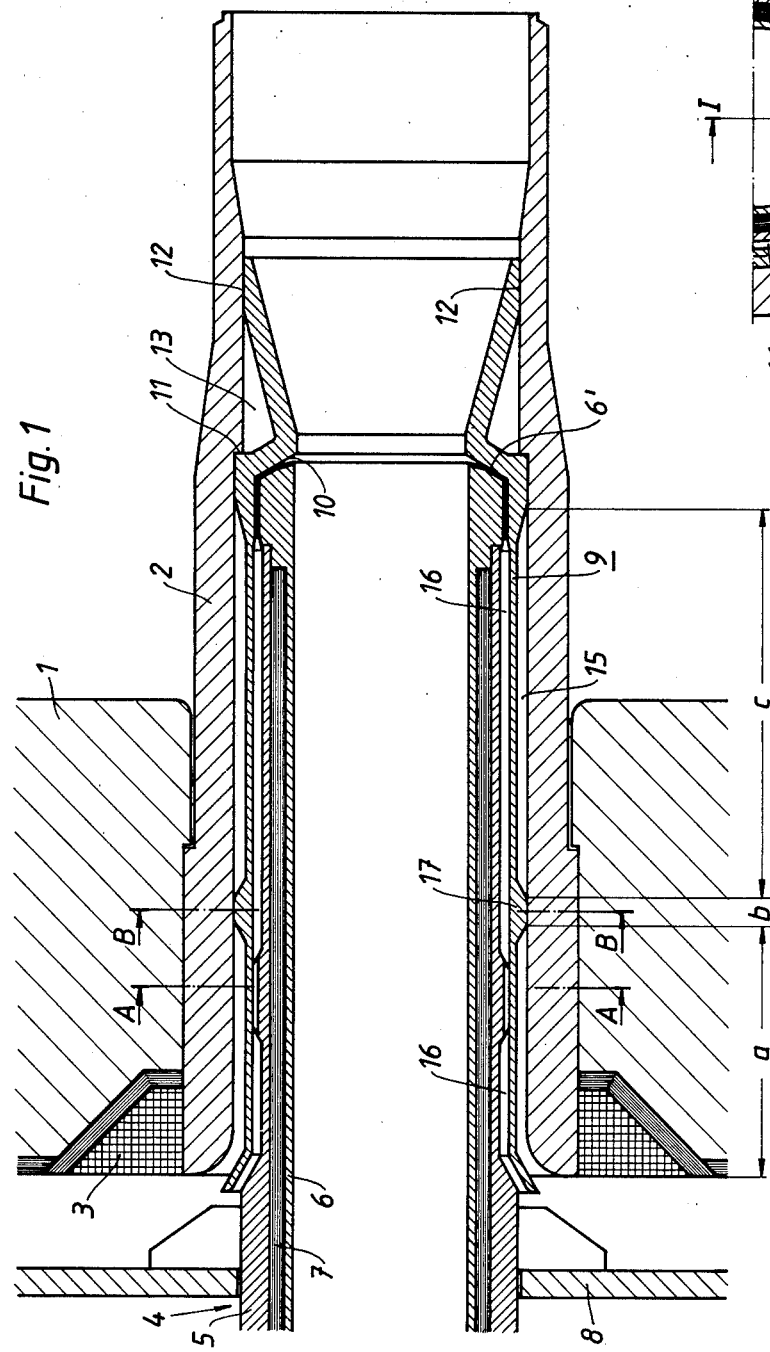
FIG. 1 shows a vertical section through a sealed fluid passageway formed in accordance with the present invention and taken along a plane I—I in FIG. 2.
Figure 2:
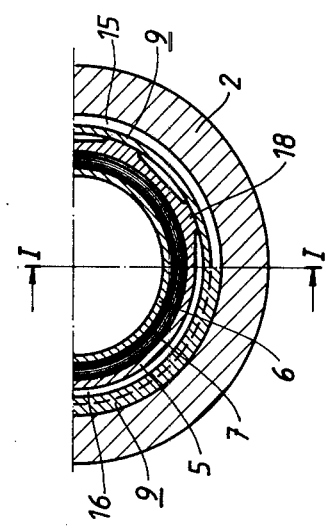
FIG. 2 shows a partial cross-section of the fluid passageway of FIG. 1, with the left half of FIG. 2 taken along a plane B—B of FIG. 1 and the right half of FIG. 2 taken along a plane A—A of FIG. 1, respectively.

Referring to the drawings, and to FIG. 1 in particular, a partial cross-section of a vertically extending, substantially cylindrically-shaped nuclear reactor pressure vessel is generally indicated at 1. A nozzle assembly 2 extends within an inlet formed through a wall of pressure vessel 1 and is fixedly attached to the wall, via a conventional weld joint 3. A fluid conduit assembly 4 is arranged within vessel 1 and includes an end portion extending concentrically through a portion of nozzle 2.

Conduit assembly 4 may include a pair of coaxially arranged conduits 5 and 6, respectively, wherein the coaxial conduits are radially spaced from one another to define a cylindrically-shaped space therebetween, with a thermally insulating material 7 positioned therein. Insulating material 7 may include a plurality of sheet metal layers stacked one on top of the other. Conduit assembly 4 is attached to a spring-like member 8 which is mounted within pressure vessel 1, and which functions to bias conduit assembly 4 toward the inlet portion of pressure vessel 1 for reasons to become clear hereafter.

A protective sleeve 9 surrounds the portion of conduit assembly 4 extending within inlet nozzle 2, wherein protective sleeve 9 is formed with a substantially conically-shaped portion 10 which confronts a similar, substantially conically-shaped end portion 6' of conduit assembly 4. It is to be noted in FIG. 1, that the respective end portions of coaxial conduits 5 and 6 engage one another to form end portion 6'. Furthermore, a separate layer of relatively hard metal is welded onto end portion 6' to provide a lasting engagement surface. Protective sleeve 9 further includes a portion 11 of substantially L-shaped configuration, which confronts a similar, substantially L-shaped portion formed on an inner surface of inlet nozzle 2. During assembly, spring member 8 biases end portion 6' of conduit assembly 4 into abutting contact with the conically-shaped portion 10 of sleeve 9. Furthermore, the L-shaped portion 11 of sleeve 9 is also forced into abutting contact with the L-shaped surface of nozzle 2, whereby protective sleeve 9 forms a fluid-tight seal between end portion 6' and inlet nozzle 2. Protective sleeve 9 is firmly shrunk into nozzle 2 to ensure a fluid-tight fit therebetween, and sleeve 9 may be formed from a material having a relatively high coefficient of thermal expansion, such as stainless steel, while nozzle 2 may be formed of a material having a lower coefficient of thermal expansion, thereby increasing the sealing force between sleeve 9 and nozzle 2 as the temperature increases.

Protective sleeve 9 further includes a cylindrically-shaped sealing surface 12 abutting inlet nozzle 2, with protective sleeve 9 having a conically-shaped cross-section extending between portion 10 and sealing surface 12, respectively. As a result, a substantially wedge-shaped chamber 13 is formed between protective sleeve 9 and inlet nozzle 2, with chamber 13 extending between portion 11 and sealing surface 12 of sleeve 9. A channel of extremely small cross-sectional dimension (not shown) is formed through protective sleeve 9 to join chamber 13 with the fluid passageway extending through inlet nozzle 2. Because of the relatively small size of the connecting channel relative to the flow passageway through nozzle 2, cold water can enter chamber 13 only at a very slow rate. This, in turn, creates a relatively low temperature gradient within chamber 13, allowing for equalization of pressure across that portion of sleeve 9 forming chamber 13.

A substantially cylindrically-shaped space 15 is formed between a longitudinally extending portion of protective sleeve 9 and a surrounding longitudinally extending portion of inlet nozzle 2, respectively. A portion 17 of sleeve 9 is located at an intermediate point along space 15 and is formed with an increased outer diameter as compared to the outer diameter of the remaining portion of sleeve 9 forming space 15. As a result, intermediate portion 17 effectively divides space 15 into three, distinct regions generally designated by the letters a, b, and c, respectively. Region a forms a portion of space 15 extending from the concentric inner end portions of sleeve 9 and inlet nozzle 2 to the increased diameter portion 17 of sleeve 9. Region b forms a portion of space 15 which extends the longitudinal length of intermediate portion 17 of sleeve 9. Region c, in turn, forms the remaining portion of space 15 which extends from intermediate portion 17 to portion 11 of sleeve 9. It is noted, that intermediate portion 17 extends toward nozzle 2 a distance, such that the cross-section of region b is less than one-fifth the cross-section of either of the remaining regions a or c, respectively.

Relatively warm water is introduced into region a from the interior portion of pressure vessel 1, with the water also circulating through regions b and c in fluid communication therewith. Because of its decreased cross-section, region b functions to reduce or throttle the rate of flow between regions a and c. As a result, the relatively warm water in region a tends to cool in temperature prior to entering regions b and c, thus creating a temperature gradient extending longitudinally through space 15 from region a toward region c. Because inlet nozzle 2 forms an outer surface of space 15, the decreasing temperature gradient in space 15 will generate a similar, decreasing temperature gradient within the wall portion of inlet nozzle 2. This means that the portion of inlet nozzle 2 positioned adjacent to region a will receive the greatest amount of heat from the water therein, while that portion of inlet nozzle 2 adjacent to region c receives a lesser amount of heat from the cooler water circulating through region c. Furthermore, the cold water flowing through conduit assembly 4 will tend to more greatly affect the portion of inlet nozzle 2 surrounding regions b and c, respectively, with the portion of inlet nozzle 2 surrounding region a being insulated due to the warm water flowing through region a. By creating a longitudinally extending decreasing temperature gradient through inlet nozzle 2, it is possible to significantly reduce the occurrence of thermal shocks resulting from the relatively warm pressure vessel and the relatively cold water affecting the same portion of inlet nozzle 2.

If a leakage of cold water should occur around end portion 6', the presently constructed coupling assembly will prevent the inlet nozzle from becoming thoroughly fatigued in the area of junction weld 3. Rather, any stresses which may arise as a result of such a leakage will be transferred to protective sleeve 9, which is designed to absorb such shocks and which can be easily replaced in the unlikely event of its rupture. In comparison, shock related damage to the inlet nozzle assembly is usually extremely difficult and expensive to repair.

A plurality of relatively short, longitudinally extending ridges 18 are circumferentially spaced about an outer surface of coaxial conduit 5. Ridges 18 contact and guide conduit 5 into protective sleeve 9 during assembly. A cylindrically-shaped cavity 16 is formed between conduit 5 and protective sleeve 9, with hot water being introduced into an open end of cavity 16 extending into pressure vessel 1. It is noted that because ridges 18 provide only a weak throttling effect, a relatively warm water temperature is maintained substantially throughout cavity 16, in order to thermally insulate sleeve 9 from the cold water flowing through conduit assembly 4. In an alternative embodiment, cavity 16 may be filled with thermally insulating sheet metal of the type employed between conduits 5 and 6, respectively. The present invention is not to be limited to the above-described embodiments but is to be limited only by the scope of the following claims.

We claim:

1. In combination with a nuclear reactor pressure vessel containing a quantity of reactor water relatively warm as compared as compared to ambient temperature, a coupling assembly for providing an insulated, fluid-tight, passageway through an inlet in a wall in said pressure vessel, said wall having an inner and outer surface, said coupling assembly comprising:

a hollow inlet nozzle extending completely through and fixedly attached to the wall of said pressure vessel by means of a weld joint located near the inner surface of the wall, said pressure vessel containing a quantity of reactor water relatively warm as compared to ambient temperature;

a separate hollow protective sleeve extending through said inlet nozzle and shrunk fit into engagement with a portion of said inlet nozzle, said protective sleeve including a longitudinally extending outer surface portion radially spaced from a longitudinally extending inner surface portion of said inlet nozzle for defining a substantially cylindrically-shaped chamber therebetween, said chamber substantially spanning said inlet and including an end portion in fluid communication with an interior portion of said pressure vessel, allowing said reactor water to flow into said chamber at a temperature level above ambient temperature via direct communication with said relatively warm reactor water present within said pressure vessel, whereby said above ambient reactor water present within said chamber functions to thermally insulate the surrounding inlet nozzle from a relatively cool inlet fluid entering said pressure vessel through said protective sleeve;

a hollow conduit assembly positioned within said hollow protective sleeve and including two opposite end portions, one of said end portions positioned within said pressure vessel, the remaining end portion having a configuration substantially similar to a confronting inner surface portion of said protective sleeve, said conduit assembly also including separate, coaxial conduit portions radially spaced from one another, spring biasing means positioned within said pressure vessel and contacting said hollow conduit assembly for biasing the remaining end portion of said hollow conduit assembly into direct, fluid-tight contact with said confronting inner surface portion of said protective sleeve to prevent fluid from flowing therebetween.

2. The combination according to claim 1 wherein said coupling assembly further defines a solid unitary structure at said remaining end portion, said coupling assembly also defining separate coaxial conduit portions radially spaced from one another to define a substantially cylindrically-shaped space therebetween, said substantially cylindrical space extending continuously from said solid remaining end portion to a point beyond said inlet nozzle and beyond said pressure vessel wall.

3. The combination according to claim 2, wherein a layer of thermal insulation substantially fills said cylindrically-shaped space defined by said coaxial conduit portions.

4. The combination according to claim 3, wherein said layer of thermal insulation comprises a plurality of metal sheets stacked one upon the other, with each sheet extending within said cylindrically-shaped chamber having a substantially tubular configuration.

5. The combination according to claim 2, wherein one of said coaxial conduit portions includes an outer surface facing said protective sleeve with a plurality of ridges formed on said outer surface extending into abutting contact with said protective sleeve.

6. The combination according to claim 1, wherein said end portion of said conduit assembly includes a conically-shaped edge, said inner surface portion of said protective sleeve defines a conical shape substantially similar in shape to said conically-shaped edge, whereby axial movement of said hollow conduit assembly responsive to said biasing means forces said conically-shaped surfaces into abutting engagement with one another to form a fluid-tight connection therebetween.

7. The combination according to claim 6, wherein an outer surface portion of said protective sleeve including a substantially L-shaped portion substantially similar in shape to an L-shaped surface portion formed in a confronting surface of said inlet nozzle, whereby axial movement of said hollow conduit assembly responsive to said biasing means forces said confronting edge surfaces into sealing abutment with one another.

8. The combination according to claim 1, wherein throttling means extend radially through an intermediate portion of said cylindrically-shaped chamber dividing said chamber into separate regions, thereby reducing the initial rate of flow of said reactor water longitudinally through said chamber for creating a temperature gradient in said water between a first region having an entrance in direct fluid communication with said reactor water, which first region is located on one side of said throttling means and a second region located on an opposite side of said throttling means from said entrance.

9. The combination according to claim 8, wherein said throttling means comprises an intermediate portion of said protective sleeve having an enlarged outer diameter extending toward said inlet nozzle, thereby providing said cylindrically-shaped chamber with a third region in fluid communication with both said first and second regions, said third region having a cross-sectional size less than one-fifth the cross-sectional size of either said first or second regions, respectively.

10. In combination with a nuclear reactor pressure vessel containing a quantity of reactor water relatively warm as compared to ambient temperature, a coupling assembly for providing an insulated, fluid-tight, passageway through an inlet in a wall in said pressure vessel, said wall having an inner and outer surface, said coupling assembly comprising:

(a) an inlet nozzle extending completely through the wall of said pressure vessel and fixably attached to said wall by means of a weld joint on the inner wall of said pressure vessel, (b) a separate protective sleeve mounted within the inlet nozzle and shrunk fit into engagement with said inlet nozzle, said sleeve substantially spanning said inlet nozzle, (c) a conduit assembly mounted within said protective sleeve, said conduit having first and second end portions with said first end portion positioned within said pressure vessel, said second end portion having a sealing configuration substantially similar to a confronting sealing configuration defined by said protective sleeve, said sleeve having a longitudinal annular section spaced between said nozzle and said conduit to define a pair of cylindrical and fluid filled insulating chambers on either side thereof, said chambers opening into an interior portion of said pressure vessel to provide fluid communication between said chambers and the interior of said vessel, said fluid communication allowing relatively warm reactor water to flow into said chambers to thermally insulate the inlet nozzle from the relatively cool inlet fluid entering said pressure vessel through said conduit, (d) a spring member for biasing the second end portion of said conduit assembly into direct fluid sealing contact with said confronting sealing configuration of said protective sleeve to prevent fluid from flowing therebetween.

11. The combination according to claim 10 wherein said conduit assembly includes separate inner and outer coaxial conduit portions radially spaced from one another to define a substantially cylindrically spaced space, said space extending from said second end portion to a point beyond said pressure vessel wall.

12. The combination according to claim 11 wherein a layer of thermal insulation substantially fills said cylindrical shaped space defined by said coaxial conduit portions.

13. The combination according to claim 10 wherein said outer coaxial conduit portion defines a plurality of ridges formed on said outer portion and extending into abuting contact with said protective sleeve.

14. The combination according to claim 10 wherein said second end portion of said conduit assembly is solid and defines a conically shaped sealing configuration, said confronting sealing configuration defined by said protective sleeve also including a conically shaped configuration, whereby said spring member forces said conically shaped surinto abuting engagement with one another to form a fluid-tight connection therebetween.

15. The combination according to claim 10 wherein a throttling means extends radially through an intermediate portion of an outer chamber defined between said sleeve and said inlet nozzle, said throttling means dividing said outer chamber into separate first and second regions and reducing the initial rate of flow of said reactor water longitudinally through said outer chamber, said throttling means thereby creating a temperature gradient in said water between said first and said second regions.

16. The combination according to claim 15 wherein said throttling means comprises an intermediate portion of said protective sleeve, said sleeve having an enlarged outer diameter extending toward said inlet nozzle to form said throttling means.

* * * * *